H. T. LOUCH.
MOTOR GOGGLES.
APPLICATION FILED OCT. 12, 1914.

1,194,198.

Patented Aug. 8, 1916.
2 SHEETS—SHEET 1.

WITNESSES

INVENTOR
Hay Thomas Louch
BY
ATTORNEY

UNITED STATES PATENT OFFICE.

HAY T. LOUCH, OF LONDON, ENGLAND.

MOTOR-GOGGLES.

1,194,198.   Specification of Letters Patent.   Patented Aug. 8, 1916.

Application filed October 12, 1914. Serial No. 866,281.

*To all whom it may concern:*

Be it known that I, HAY THOMAS LOUCH, a subject of the King of Great Britain and Ireland, and residing at 65 Hatton Garden, London, E. C., England, have invented certain new and useful Improvements in Motor-Goggles, of which the following is a specification.

This invention relates to improvements in motor-goggles or the like.

The object of the present invention is to devise an improved form of motor-goggles or the like in which complete protection for the eyes will be secured while the ventilation within the goggles will be considerably improved.

The invention consists in motor-goggles or the like provided with one or more large apertures or openings arranged in the framework or casing of the goggles and protected by a single screen connected with the framing and arranged at an angle to the plane of the opening or openings.

The invention also consists in adapting the screen to be arranged in any desired angular position relatively to the plane of the opening or openings as may be found most desirable in practice.

The invention also consists in the particular forms of goggles hereinafter more particularly described with reference to the accompanying drawings, which illustrate two modes of carrying out the invention, and in which—

Figure 1:
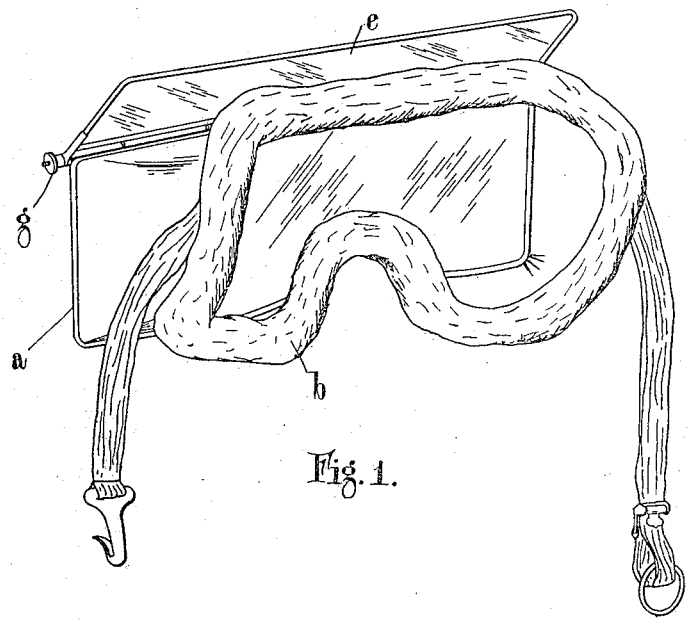
Figure 2:
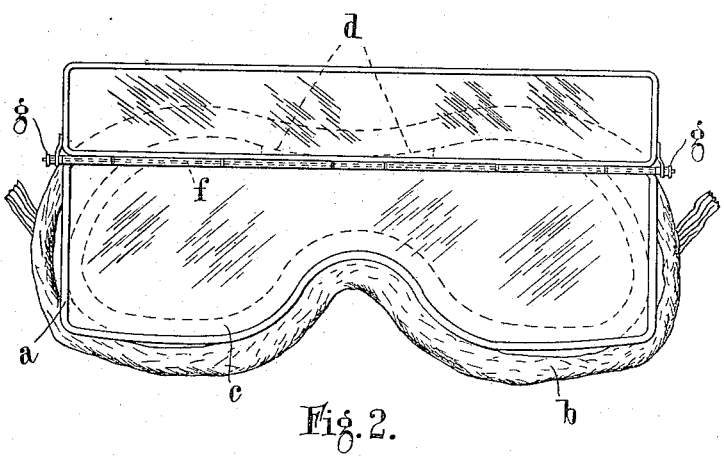
Figure 3:
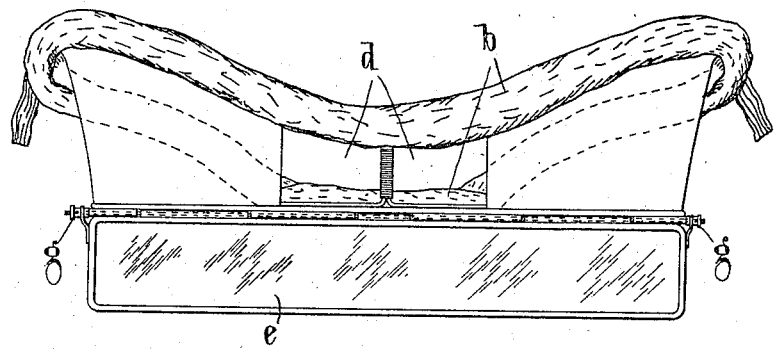
Figure 4:
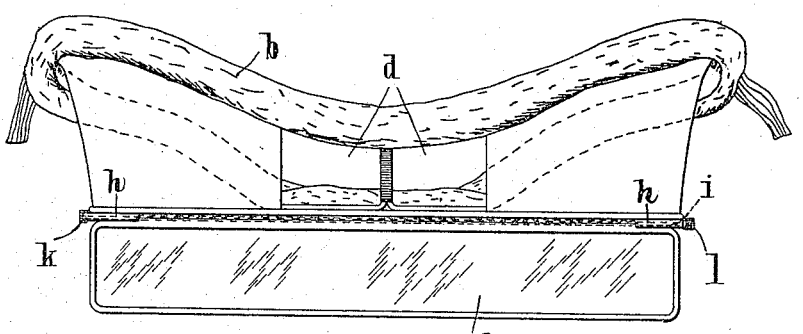

Figure 1 is a perspective view showing one convenient form of device constructed in accordance with the invention. Fig. 2 is a front elevation while Fig. 3 is a plan. Fig. 4 is a similar view to Fig. 3 showing a slightly modified form of construction.

In carrying my invention into effect in one convenient manner I provide any suitable frame $a$ for the goggles or like protecting devices, formed of metal wire, or other suitable material, the sides and lower portion of the frame being covered with silk or like porous or other material and that part of the frame which comes in contact with the face of the wearer being protected, if desired, by means of fur $b$ or other suitable fabric or material.

The front portion of the frame is suitably constructed to take the lens or lenses or glass $c$ of the goggles serving as the protector for the eyes made of any suitable material and of any convenient form, while the upper part of the frame is open or provided with one or more apertures $d$ (Figs. 3 and 4), although it is to be understood that the aperture or apertures may be arranged in any other suitable position while the upper part of the frame may be closed. The openings $d$ in the frame are protected by means of a screen $e$ which is arranged at an angle to the plane of the opening, which angle may, if desired, be suitably adjusted by means of a screw or other adjusting device provided for the purpose so that the amount of ventilation secured by the device may be suitably regulated.

In the example illustrated in Figs. 1 to 3 the screen $e$ is pivotally mounted upon a fixed rod $f$ carried by the framework of the goggles and having screw-threaded portions at its respective ends adapted to be engaged by milled nuts $g$ or the like so that upon slacking back the nuts the angular position of the screen may be readily adjusted and the screen held in the desired position by tightening up the nuts $g$. The screen or like device causes a vacuum or partial vacuum to be formed within the frame of the goggles so that adequate ventilation therein is insured while at the same time the screen or cover acts to effectually prevent the entry of wind or dust within the goggles so that the eyes of the wearer are thoroughly protected thereby.

Fig. 4 shows a slightly modified form of device in which the screen $e$ is mounted upon a tube or is formed with a tubular boss adapted to rotate within a fixed tube $h$ which is cut away for a convenient portion of its length, the two parts being held in their correct relative positions by means of a central fixed rod or pin $i$ secured to the fixed tube $h$ at one end by means of a cap $k$ and having at its other end a screw-threaded portion adapted to be engaged by a milled nut $l$, the arrangement being such that the adjustment of the angular position of the screen $e$ may be effected by the use of one hand.

It is to be noted that in Figs. 3 and 4 the screen-like device $e$ is shown as bent down into the horizontal plane to enable the arrangement of the apertures $d$ to be seen more clearly.

It will be understood that I do not wish to confine my invention to any particular form or construction of goggles nor to any particular material from which the various parts are formed as this and other details may be suitably modified to suit varying requirements. Furthermore, my invention may be readily applied to goggles having a single lens or like protecting device or a pair of the same, one for each eye.

Having now described my invention what I claim as new and desire to secure by Letters Patent is:

1. Motor goggles comprising in combination a framework, a fabric casing secured to said framework and forming with the lens a closed box-like structure with the exception of one or more apertures therein and a screen connected with the framing adjacent to the apertures and arranged at an angle relatively to the plane thereof.

2. Motor goggles comprising in combination a framework, a fabric casing secured to said framework and forming with the lens a closed box-like structure with the exception of an aperture therein and an adjustable screen secured to the framework adjacent to said aperture and arranged at an angle to the plane of the aperture.

3. Motor goggles comprising in combination a framework, a lens mounted in said framework, a fabric casing secured to said framework and forming with the lens a closed box-like structure with the exception of an aperture in the upper part of said fabric casing and an adjustable screen connected to said framework and arranged at an angle to the plane of said aperture.

4. Motor goggles comprising in combination a framework, a lens mounted in said framework, a fabric casing secured to said framework and forming therewith a closed box-like structure with the exception of an aperture in said fabric, a screen hingedly secured to said framework so that it may be arranged at any angle to the plane of said aperture and means for holding said screen in any desired angular position.

5. Motor goggles comprising a framework, a transparent plate mounted in said framework, a fabric casing secured to said framework and forming with said plate a closed box-like structure having an aperture in said casing, a screen hingedly secured upon a rod forming part of said framework so that it may be set at any desired angle to the plane of the aperture and right and left-hand screw-threaded nuts engaging correspondingly screw-threaded portions of said rod for holding the screen in any angular position in which it may be set.

In testimony whereof I have signed my name to this specification in the presence of two subscribing witnesses.

HAY T. LOUCH.

Witnesses:
W. E. BEARNE,
T. T. WITHAM.